United States Patent
Zhou

(10) Patent No.: US 10,740,605 B2
(45) Date of Patent: Aug. 11, 2020

(54) IRIS COLLECTION METHOD, ELECTRONIC DEVICE, AND COMPUTER READABLE STORAGE MEDIUM

(71) Applicant: GUANGDONG OPPO MOBILE TELECOMMUNICATIONS CORP., LTD., Dongguan (CN)

(72) Inventor: Yibao Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 157 days.

(21) Appl. No.: 15/984,480

(22) Filed: May 21, 2018

(65) Prior Publication Data

US 2019/0012543 A1 Jan. 10, 2019

(30) Foreign Application Priority Data

Jul. 5, 2017 (CN) .......................... 2017 1 0541475

(51) Int. Cl.
*G06K 9/00* (2006.01)
*H04N 5/33* (2006.01)

(52) U.S. Cl.
CPC ....... *G06K 9/00604* (2013.01); *G06K 9/0061* (2013.01); *G06K 9/00221* (2013.01); *G06K 9/00617* (2013.01); *H04N 5/33* (2013.01)

(58) Field of Classification Search
CPC .. H04N 5/33; G06K 9/00604; G06K 9/00221; G06K 9/0061; G06K 9/00617
See application file for complete search history.

(56) References Cited

U.S. PATENT DOCUMENTS

| | | | | |
|---|---|---|---|---|
| 8,366,273 | B2* | 2/2013 | Shih | A61B 3/14 351/212 |
| 9,736,438 | B2* | 8/2017 | Asano | G01S 17/89 |
| 9,924,090 | B2* | 3/2018 | Zhang | G06K 9/00604 |
| 10,262,203 | B2* | 4/2019 | Sung | H04N 5/2256 |
| 2011/0002510 | A1 | 1/2011 | Hanna | |
| 2016/0262615 | A1 | 9/2016 | Jung et al. | |
| 2016/0283789 | A1* | 9/2016 | Slaby | G06K 9/00604 |
| 2017/0061210 | A1 | 3/2017 | Ollila | |
| 2019/0012543 | A1* | 1/2019 | Zhou | G06K 9/00221 |

FOREIGN PATENT DOCUMENTS

| | | |
|---|---|---|
| CN | 2672768 Y | 1/2005 |
| CN | 103024165 A | 4/2013 |

(Continued)

OTHER PUBLICATIONS

European Search Report in European application No. 18174679.3, dated Dec. 6, 2018.

(Continued)

*Primary Examiner* — Gregory M Desire

(57) ABSTRACT

An iris collection method is used for an electronic device. The electronic device includes an iris recognition module. The iris recognition module includes an infrared light source. The iris collection method includes acquiring a distance between the iris recognition module and an iris of a person to be recognized; adjusting light intensity of transmitted infrared light according to the distance by the infrared light source, so that light intensity of infrared light reaching the iris of the person to be recognized is a target light intensity; and collecting an iris image of the iris by acquiring infrared light having the target light intensity reflected by the iris. An electronic device and a computer readable storage medium are also disclosed.

17 Claims, 8 Drawing Sheets

(56) References Cited

FOREIGN PATENT DOCUMENTS

| CN | 105279490 A | 1/2016 |
|---|---|---|
| CN | 105426874 A | 3/2016 |
| CN | 205158390 U | 4/2016 |
| CN | 105550631 A | 5/2016 |
| CN | 105893988 A | 8/2016 |
| CN | 106022275 A | 10/2016 |
| WO | 0198730 A2 | 12/2001 |
| WO | 2015108904 A1 | 7/2015 |

OTHER PUBLICATIONS

International Search Report in international application No. PCT/CN2017/091901, dated Apr. 2. 2018.
Written Opinion of the International Search Authority in international application No. PCT/CN2017/091901, dated Apr. 2, 2018.
First Office Action of the Chinese application No. 201710541475.5, dated Jul. 29, 2019.
First Office Action of the European application No. 18174679.3, dated Oct. 11, 2019.
Unknown: "Time of flight—Wikipedia", Jun. 10, 2017 (Jun. 10, 2017), XP055675414, Retrieved from the Internet: URL:https://en.wikipedia.org/w/index.php?title= Time of flight&oldid=784793255 [retrieved on Mar. 10, 2020].
Unknown; "Uncertainty in Measurement", Mar. 27, 2005 (Mar. 27, 2005), XP055675428, Retrieved from the Internet: URL:https://web.archive.org/web/20050327172707if/http://www.phy. ilstu .edu :80/slh/Uncertainty%20Measurement.pdf [retrieved on Mar. 10, 2020].
Oral Proceedings of the European application No, 18174679.3, dated Mar. 19, 2020.
Second Office Action of the Chinese application No. 201710541475.5, dated Mar. 31, 2020.

\* cited by examiner

IRIS COLLECTION METHOD, ELECTRONIC DEVICE, AND COMPUTER READABLE STORAGE MEDIUM

BACKGROUND

Field

The present disclosure relates to a field of biometric recognition, and more particularly to an iris collection method, an electronic device, and a computer readable storage medium.

Background

In some scenarios, iris recognition requires an auxiliary infrared light source to acquire an iris image with good brightness and clear texture. In the process of the iris recognition, a distance between an iris of a user and an iris recognition module changes. However, light intensity of a conventional infrared light source is fixed. Accordingly, when the user is far away, the light intensity transmitted to eyes of the user by the infrared light source may not be high enough. As such, the iris recognition module cannot acquire a high quality iris image.

BRIEF DESCRIPTION OF THE DRAWINGS

Advantages of the present disclosure will be apparent and understood easily from the description in conjunction with embodiments of the following drawings.

DETAILED DESCRIPTION OF ILLUSTRATED EMBODIMENTS

Figure 1:
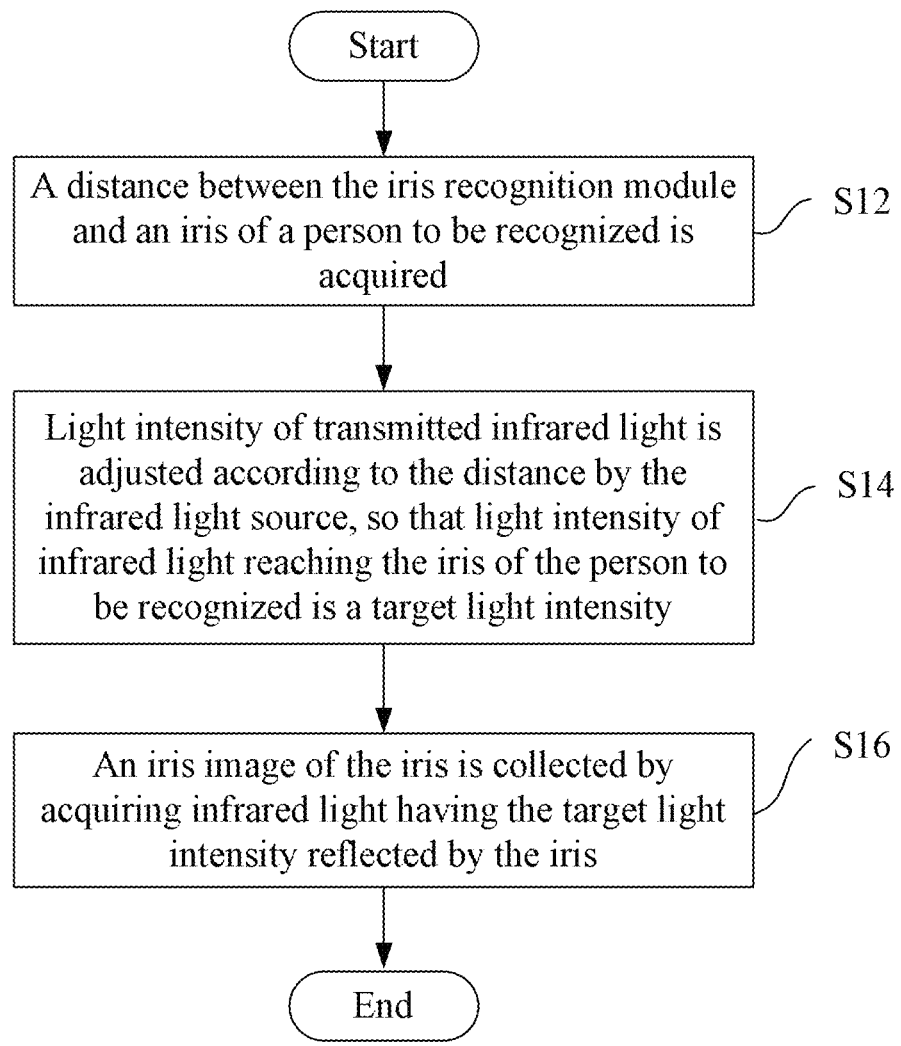
FIG. 1 illustrates a flowchart of an iris collection method in accordance with an embodiment of the present disclosure.

Hereinafter, exemplary embodiments of the present disclosure will be described with reference to the accompanying drawings. The same or similar elements or the elements with the same or similar functions will be designated by the same or similar reference numerals throughout the following description and drawings. The following embodiments described with the accompanying drawings are merely exemplary to explain the present disclosure and not to be construed as limiting the present disclosure.

Figure 2:
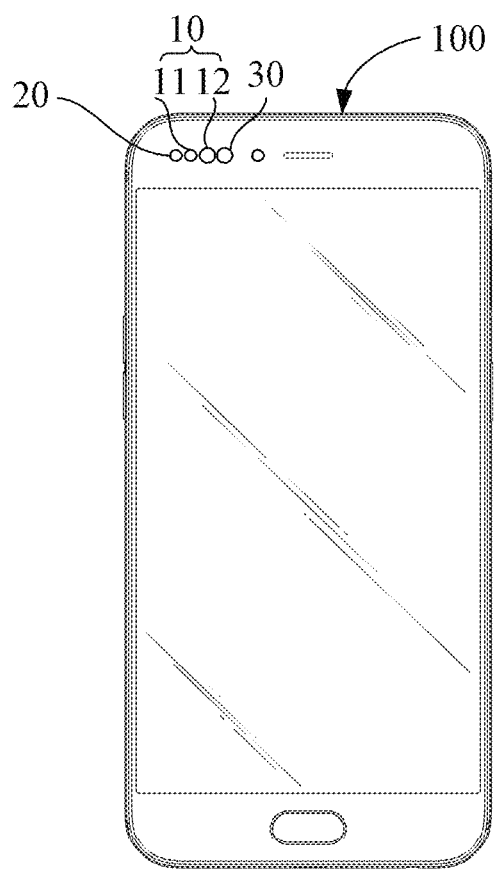
FIG. 2 illustrates an electronic device in accordance with an embodiment of the present disclosure.

Please refer to FIG. 1 and FIG. 2. An iris collection method in accordance with an embodiment of the present disclosure is used for an electronic device 100. The electronic device 100 includes an iris recognition module 10. The iris recognition module 10 includes an infrared light source 11. The iris collection method includes the following operations.

At block S12, a distance between the iris recognition module 10 and an iris of a person to be recognized is acquired.

At block S14, light intensity of transmitted infrared light is adjusted according to the by the infrared light source 11, so that light intensity of infrared light reaching the iris of the person to be recognized is a target light intensity.

At block S16, an iris image of the iris is collected by acquiring infrared light having the target light intensity reflected by the iris.

Please refer to FIG. 2. The iris collection method in accordance with the embodiment of the present disclosure can be implemented by the electronic device 100 in accordance with the embodiment of the present disclosure. The electronic device 100 in accordance with the embodiment of the present disclosure includes the iris recognition module 10 and a distance detector 20. Block S12 may be implemented by the distance detector 20. Block S14 may be implemented by the infrared light source 11. Block S16 may be implemented by an infrared camera 12.

That is, the distance detector 20 can be configured to acquire the distance between the iris recognition module 10 and the iris of the person to be recognized. The infrared light source 11 can be configured to adjust the light intensity of the transmitted infrared light according to the distance, so that the light intensity of the infrared light reaching the iris of the person to be recognized is the target light intensity. The infrared camera 12 can be configured to collect the iris image of the iris of the person to be recognized by acquiring the infrared light having the target light intensity reflected by the iris.

Figure 3:
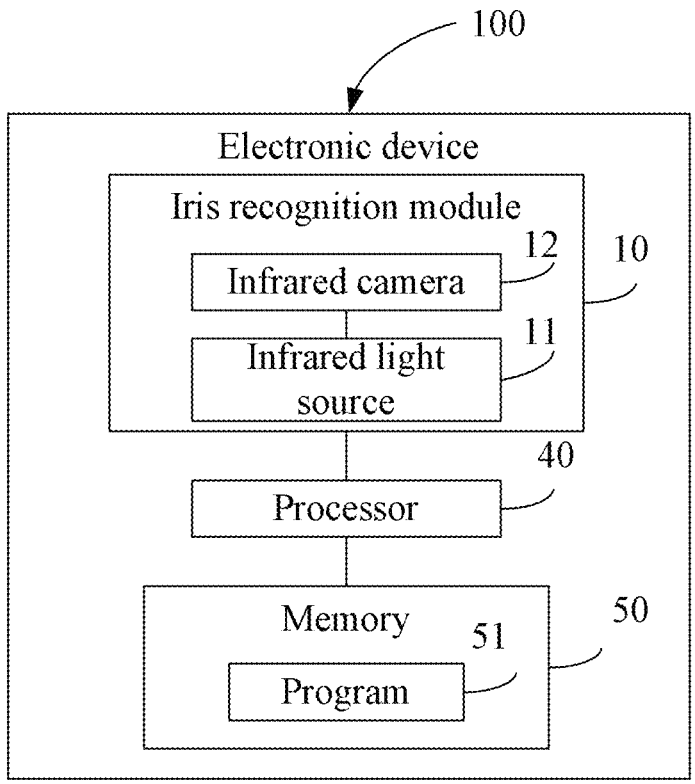
FIG. 3 illustrates a block diagram of an electronic device in accordance with an embodiment of the present disclosure.

Please refer to FIG. 1 to FIG. 3. In some embodiments, the electronic device 100 includes the iris recognition module 10, at least one processor 40, a memory 50, and at least one program 51. The at least one program 51 is stored in the memory 50 and configured to be executed by the at least one processor 40. The at least one program 51 includes instructions configured to execute the following operations.

At block S12, the distance between the iris recognition module 10 and the iris of the person to be recognized is acquired.

At block S14, the light intensity of the transmitted infrared light is adjusted according to the distance by the infrared light source 11, so that the light intensity of the infrared light reaching the iris of the person to be recognized is the target light intensity.

At block S16, the iris image of the iris is collected by acquiring the infrared light having the target light intensity reflected by the iris.

When the infrared camera 12 collects an iris image, especially an iris image of an Asian person, the infrared light source 11 is required to serve as a supplemental light source because the color of an iris of an Asian person is dark. Only by doing so, an iris image with good brightness and clear texture can be acquired. However, in the process of collecting the iris image by the infrared camera 12, a collection distance from the iris of the person to be recognized by the iris recognition module 10 is not fixed, but a conventional infrared light source supplements light with a fixed light intensity. As such, when the person to be recognized is far away from a conventional iris recognition module, effect of supplementing light of the conventional infrared light source is weakened, thereby affecting the quality of the collected iris image.

In the iris collection method in accordance with the embodiment of the present disclosure, the light intensity of the infrared light source 11 is adjusted according to a distance between the iris recognition module 10 and the iris of the person to be recognized, so that the light intensity transmitting to the iris of the person to be recognized always remains an optimal light intensity to acquire an iris image with good brightness and clarity.

Figure 4:
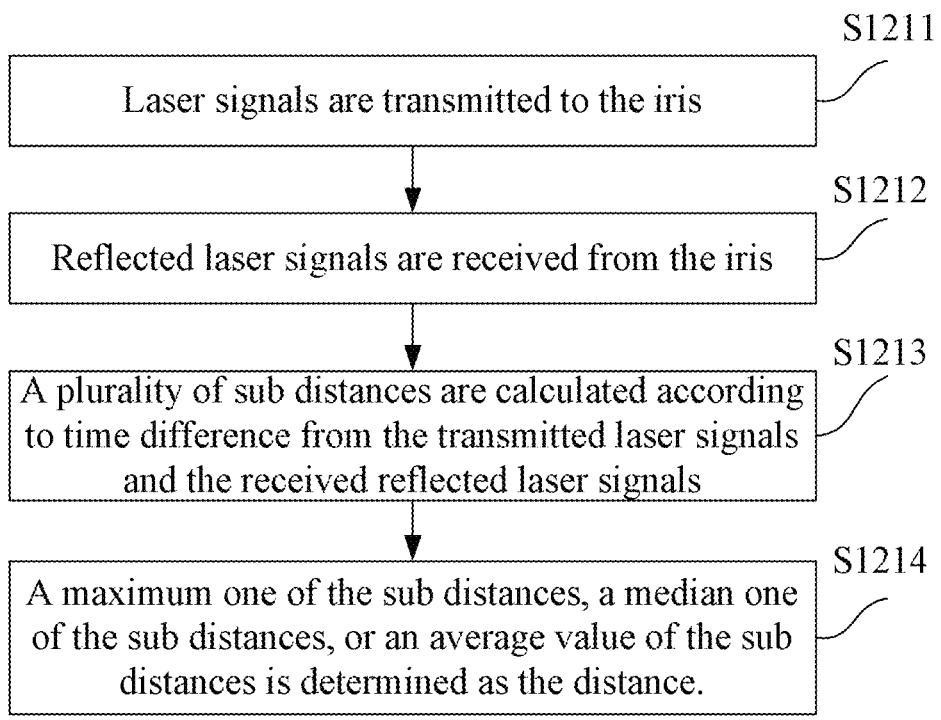
FIG. 4 illustrates a flowchart of an iris collection method in accordance with another embodiment of the present disclosure.
Figure 5:
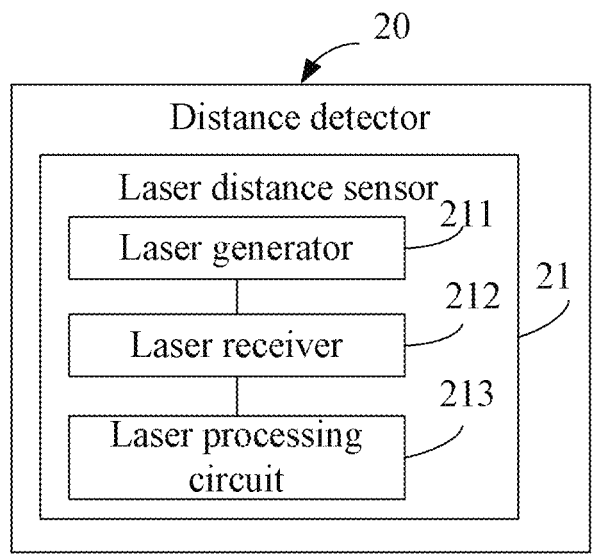
FIG. 5 illustrates a block diagram of a distance detector in accordance with an embodiment of the present disclosure.

Please refer to FIG. 2, FIG. 4, and FIG. 5. In some embodiments, the distance detector 20 includes a laser distance sensor 21. Acquiring the distance between the iris recognition module 10 and the iris of the person to be recognized at block S12 includes the following operations.

At block S1211, laser signals are transmitted to the iris.

At block S1212, reflected laser signals are received from the iris.

At block S1213, a plurality of sub distances are calculated according to time difference from the transmitted laser signals and the received reflected laser signals.

At block S1214, a maximum one of the sub distances is determined as the distance. Alternatively, a median one of the sub distances is determined as the distance. Alternatively, an average value of the sub distances is determined as the distance.

Please refer to FIG. 2, FIG. 4, and FIG. 5. In some embodiments, the laser distance sensor 21 includes a laser generator 211, a laser receiver 212, and a laser processing circuit 213. Block S1211 may be implemented by the laser generator 211. Block S1212 may be implemented by the laser receiver 212. Blocks S1213 and S1214 may be implemented by the laser processing circuit 213.

That is, the laser generator 211 can be configured to transmit the laser signals to the iris. The laser receiver 212 can be configured to receive the reflected laser signals from the iris. The laser processing circuit 213 can be configured to calculate the plurality of sub distances according to the time differences from the transmitted laser signal and the received reflected laser signals, and configured to determine the maximum one of the sub distances as the distance, the median one of the sub distances as the distance, or the average value of the sub distances as the distance.

Please refer to FIG. 2 to FIG. 5. In some embodiments, the program 51 includes instructions configured to execute of the following operations.

At block S1211, the laser generator 211 is controlled to transmit the laser signals to the iris.

At block S1212, the laser receiver 212 is controlled to receive the reflected laser signals from the iris.

At block S1213, the plurality of sub distances are calculated according to the time differences from the transmitted laser signals to the received reflected laser signals.

At block S1214, the maximum one of the sub distances is determined as the distance; alternatively, the median one of the sub distances is determined as the distance; alternatively, the average value of the sub distances is determined as the distance.

In detail, the laser distance sensor 21 may be a laser sensor adopting pulse distance measurement or a laser sensor adopting phase distance measurement. In the embodiment of the present disclosure, the laser distance sensor 21 is a laser sensor adopting pulse distance measurement. A principle of the laser distance sensor 21 adopting pulse distance measurement includes transmitting light pulses to the iris by the laser generator 211, receiving reflected light pulses by the laser receiver 212 from the iris after the light pulses are reflected by a person to be tested (i.e., the iris of the person to be recognized in the embodiment of the present disclosure), and calculating, by the laser processing circuit 213, a distance according to time differences from transmitting the light pulses to the iris to receiving the reflected light pulses from the iris (i.e., back-and-forth propagation time of the light pulses along a distance to be measured) and propagation speeds of the light pulses.

Figure 6:
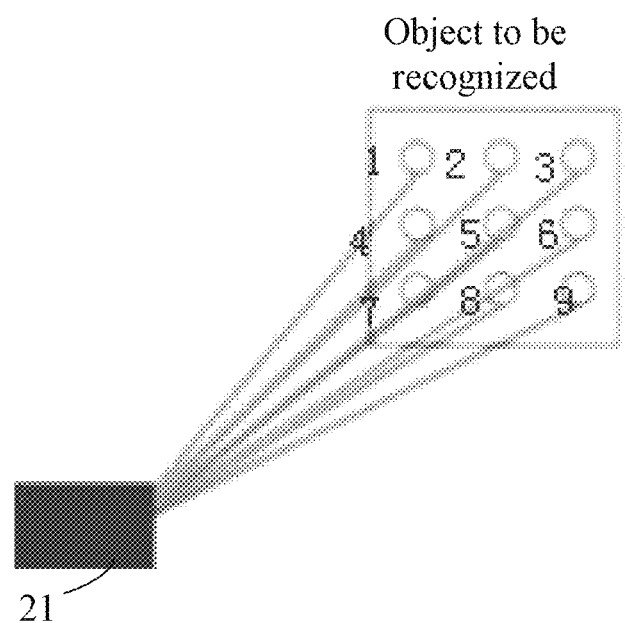
FIG. 6 illustrates a principle of an iris collection method in accordance with an embodiment of the present disclosure.

Please refer to FIG. 5 and FIG. 6. The laser distance sensor 21 includes a plurality of laser generators 211 arranged in a matrix. Light transmitting directions of laser signals of the laser generators 211 are different, and light wavelengths of the laser signals are different. Taking the laser distance sensor 21 including nine laser generators 211 for example, the distance measurement process of the laser distance sensor 21 is described as follows. When the laser distance sensor 21 works, the nine laser generators 211 transmit the laser signals synchronously or in a time division manner to the iris. The laser signals transmitted by the nine laser generators 211 reach nine areas of the person to be recognized. The laser signals are reflected by the iris after reaching the person to be recognized. The laser receiver 212 includes filters with various bands from the iris. Each of the filters corresponds to one of light wavelengths of the nine laser generators 211. That is, each of the filters can be passed by only the laser signal corresponding to the one of light wavelengths of the nine laser generators 211 and can filter the laser signals of other bands. As such, the laser distance sensor 21 includes nine receiving areas. Since the time differences from transmitting the laser signals to the iris to receiving the reflected laser signals from the iris are different, the laser processing circuit 213 acquires the distance by processing nine sub distances or selecting one of the nine sub distances. In detail, a median one or an average value of the nine sub distances is served as the distance. Alternatively, a maximum one of the nine sub distances is served as the distance.

Coverage of the laser signals transmitted by the laser distance sensor 21 matches a field of view of the infrared camera 12 in the iris recognition module 10. For example, the coverage of the laser signals is equal to the field of view of the infrared camera 12. Alternatively, the coverage of the laser signals is approximately greater than the field of view of the infrared camera 12. Therefore, it can be ensured that the distance acquired by the laser distance sensor 21 is more accurate.

In some embodiments, the laser generators 211 and the infrared light source 11 are the same element. The infrared light source 11 can transmit the infrared laser.

As such, the infrared light source 11 not only can assist the iris recognition module 10 to collect the iris of the person to be recognized, but also can assist the laser distance sensor 21 to measure the distance between the iris recognition module 10 and the iris of the person to be recognized, thereby implementing the multiplexing of the infrared light source 11. The multiplexing of the infrared light source 11 can reduce elements included in the electronic device 100, and a ratio of the laser distance sensor 21 to the electronic device 100 can be decreased to a certain extent, so that the electronic device 100 can be widescreen or acquire more space for integrating more functions.

Figure 7:
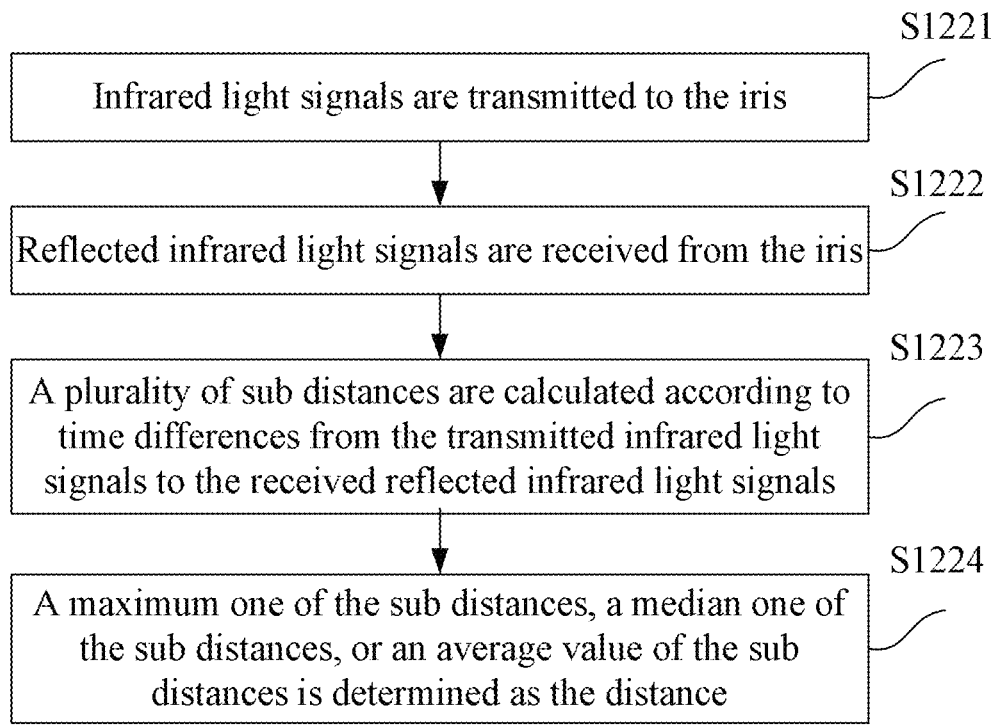
FIG. 7 illustrates a flowchart of an iris collection method in accordance with yet another embodiment of the present disclosure.
Figure 8:
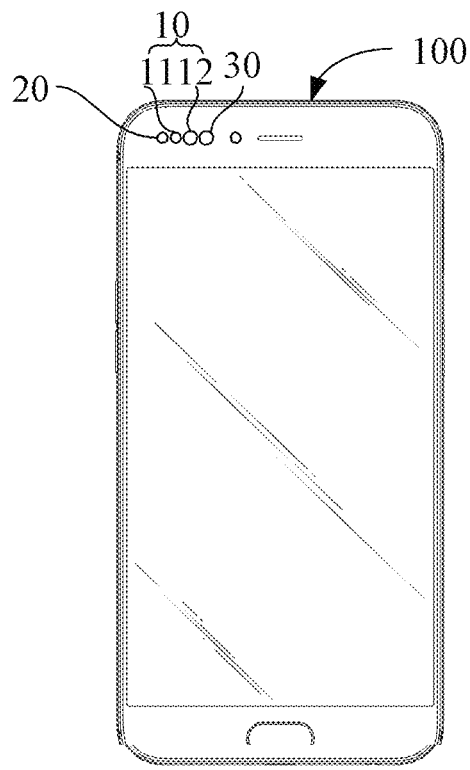
FIG. 8 illustrates an electronic device in accordance with another embodiment of the present disclosure.
Figure 9:
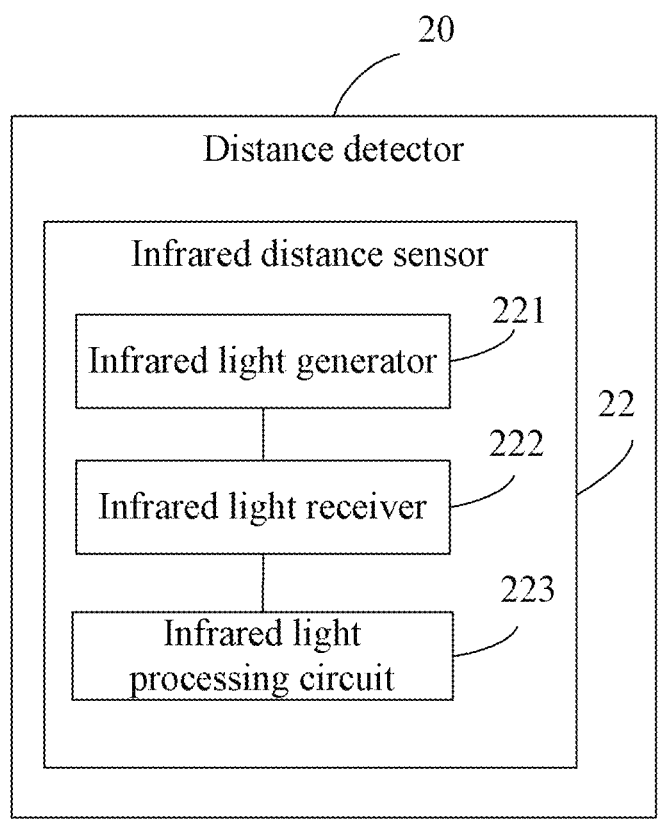
FIG. 9 illustrates a block diagram of a distance detector in accordance with another embodiment of the present disclosure.

Please refer to FIG. 7, FIG. 8, and FIG. 9. In some embodiments, the distance detector 20 includes an infrared distance sensor 22. Acquiring the distance between the iris recognition module 10 and the iris of the person to be recognized at block S12 in FIG. 1 includes the following operations.

At block S1221, infrared light signals are transmitted to the iris.

At block S1222, reflected infrared light signals are received from the iris.

At block S1223, a plurality of sub distances are calculated according to time differences from the transmitted infrared light signals to the received reflected infrared light signals.

At block S1224, a maximum one of the sub distances is determined as the distance. Alternatively, a median one of the sub distances is determined as the distance. Alternatively, an average value of the sub distances is determined as the distance.

Please refer to FIG. 8 and FIG. 9. In some embodiments, the infrared distance sensor 22 includes an infrared light generator 221, an infrared light receiver 222, and an infrared light processing circuit 223. Block S1221 may be implemented by the infrared light generator 221. Block S1222 may be implemented by the infrared light receiver 222. Blocks S1223 and S1224 may be implemented by the infrared light processing circuit 223.

That is, the infrared light generator 221 can be configured to transmit the infrared light signals to the iris. The infrared light receiver 222 can be configured to receive the reflected infrared light signals from the iris. The infrared light processing circuit 223 can be configured to calculate the plurality of sub distances according to the time differences from the transmitted infrared light signals to the received reflected infrared light signals, and configured to determine the maximum one of the sub distances as the distance, the median one of the sub distances as the distance, or the average value of the sub distances as the distance.

Please refer to FIG. 3, FIG. 7, FIG. 8, and FIG. 9. In some embodiments, the program 51 includes instructions configured to execute the following operations.

At block S1211, the infrared light generator 221 is controlled to transmit the infrared light signals to the iris.

At block S1222, the infrared light receiver 222 is controlled to receive the reflected infrared light signals from the iris.

At block S1223, the plurality of sub distances are calculated according to the time differences from the infrared light signals to the received reflected infrared light signals.

At block S1224, the maximum one of the sub distances is determined as the distance. Alternatively, the median one of the sub distances is determined as the distance. Alternatively, the average value of the sub distances is determined as the distance.

Similar to the laser distance sensor 21 in FIG. 5, the infrared distance sensor 22 also calculates the distance according to the time differences from the transmitted infrared light signals and to the received reflected infrared light signals (i.e., back-and-forth propagation time of the infrared light signals along a distance to be measured) and propagation speeds of the infrared light signals. The infrared distance sensor 22 in accordance with the embodiment of the present disclosure also includes a plurality of infrared light generators 221 arranged in a matrix and configured to transmit the infrared light signals to the iris. Light transmitting directions of the infrared light signals of the infrared light generators 221 are different, and light wavelengths of the transmitted infrared light signals are different. The infrared light receiver 222 includes filters respectively corresponding to one of the light wavelengths of the transmitted infrared light signals, so that the sub distances can be calculated by acquiring data of the time differences. The infrared light processing circuit 223 acquires the distance by processing the sub distances or selecting one of the sub distances. In detail, a median one or an average value of the sub distances is served as the distance by the infrared light processing circuit 223. Alternatively, a maximum one of the nine sub distances is served as the distance by the infrared light processing circuit 223.

Coverage of the infrared light signals transmitted by the infrared light distance sensor 22 matches a field of view of the infrared camera 12 in the iris recognition module 10. For example, the coverage of the infrared light signals is equal to the field of view of the infrared camera 12. Alternatively, the coverage of the infrared light signals is approximately greater than the field of view of the infrared camera 12. Therefore, it can be ensured that the distance acquired by the infrared light distance sensor 22 is more accurate.

In some embodiments, the infrared light generators 221 and the infrared light source 11 are the same element. The infrared light source 11 can transmit infrared light to the iris.

As such, the infrared light source 11 not only can assist the iris recognition module 10 to collect the iris of the person to be recognized, but also can assist the infrared light distance sensor 22 to measure the distance between the iris recognition module 10 and the iris of the person to be recognized, thereby implementing the multiplexing of the infrared light source 11. The multiplexing of the infrared light source 11 can reduce elements included in the electronic device 100, and a ratio of the infrared light distance sensor 22 to the electronic device 100 can be decreased to a certain extent, so that the electronic device 100 can be widescreen or acquire more space for integrating more functions.

Figure 10:
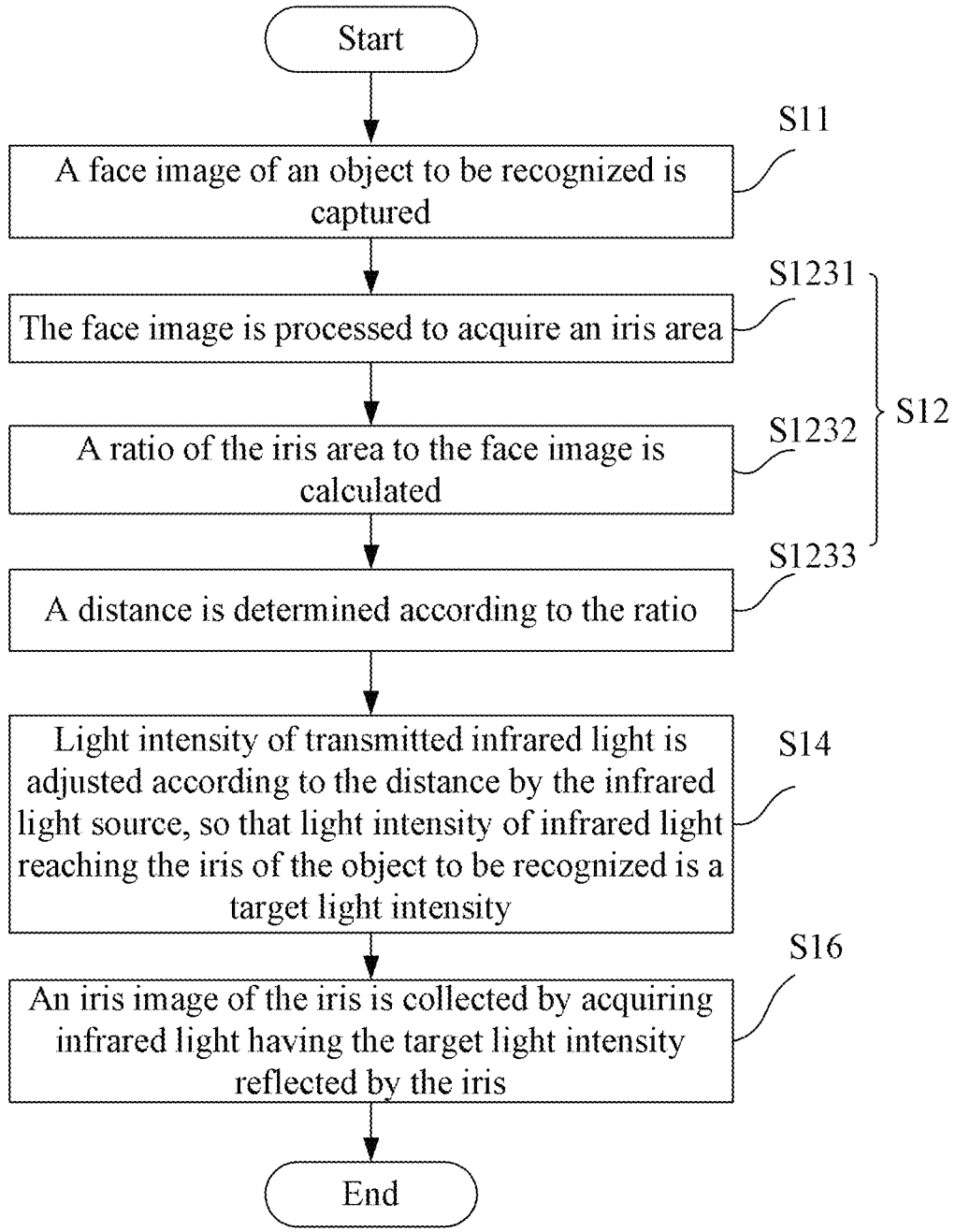
FIG. 10 illustrates a flowchart of an iris collection method in accordance with still yet another embodiment of the present disclosure.

Please refer to FIG. 10. In some embodiments, the iris collection method in accordance with an embodiment of the present disclosure further includes the following operations.

At block S11, a face image of a person to be recognized is captured.

Acquiring the distance between the iris recognition module 10 and the iris of the person to be recognized at block S12 in FIG. 1 includes the following operations.

At block S1231, the face image is processed to acquire an iris area.

At block S1232, a ratio of the iris area to the face image is calculated.

At block S1233, a distance is determined according to the ratio.

Figure 11:
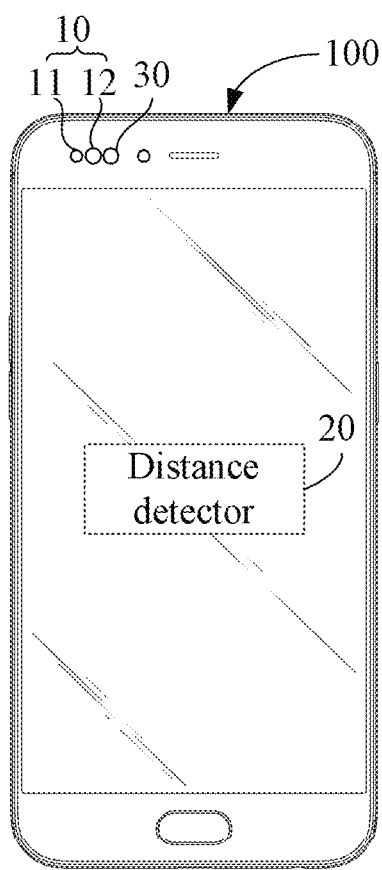
FIG. 11 illustrates an electronic device in accordance with yet another embodiment of the present disclosure.

Please refer to FIG. 10 and FIG. 11. In some embodiments, block S11 may be implemented by the infrared camera 12. Block S1231, block S1232, and block S1233 may be implemented by the distance detector 20. At this time, the distance detector 20 is the processor 40 in FIG. 3.

That is, the infrared camera 12 can be configured to capture the face image of the person to be recognized. The distance detector 20 can be configured to process the face image to acquire the iris area, calculate the ratio of the iris area to the face image, and determine the distance according to the ratio.

Please refer to FIG. 3, FIG. 10, and FIG. 11. In some embodiments, the program 51 further includes instructions configured to execute the following blocks.

At block S11, the infrared camera 12 is controlled to capture the face image of the person to be recognized.

At block S1231, the face image is processed to acquire the iris area.

At block S1232, the ratio of the iris area to the face image is calculated.

At block S1233, the distance is determined according to the ratio.

In some embodiments, the electronic device 100 further includes a visible light camera 30. Block S11 may be implemented by the visible light camera 30. That is, the visible light camera 30 can be configured to capture the face image of the person to be recognized.

In some embodiments, the program 51 further includes instructions configured to control the visible light camera 30 to capture the face image of the person to be recognized.

First, the infrared camera 12 or the visible light camera 30 captures the face image of the person to be recognized. Then, the processor 40 processes the face image to extract the iris area. In detail, when the face image is captured by the infrared camera 12, the processor 40 directly extracts a contour edge of the face image and acquires the iris area by performing a Hough circle transform on an image which is acquired after the contour edge of the face image is extracted. When the face image is captured by the visible light camera 30, the processor 40 converts the face image with RGB format into a face image with YCrCb format, extracts a contour edge of the face image with YCrCb, and acquires the iris area by performing a Hough circle transform on an image which is acquired after the contour edge of the face image with YCrCb is extracted. After the iris area is extracted, the ratio of the iris area occupying the face image is calculated. A mapping relationship exists between the ratio of the iris area occupying the face image and the distance. The mapping relationship may be acquired by a large number of experiments. The mapping relationship is stored in the memory 50. The distance can be determined according to the ratio and the mapping relationship after the processor 40 calculates the ratio.

In some embodiments, adjusting the light intensity of the transmitted infrared light according to the distance by the infrared light source 11 is implemented by adjusting a working current of the infrared light source 11. When the distance from the iris recognition module 10 to the person to be recognized is far, the working current of the infrared light source 11 is large. When the distance from the iris recognition module 10 to the person to be recognized is close, the working current of the infrared light source 11 is small.

It can be appreciated that when transmitted power of the infrared light source 11 is large, the light intensity of the infrared light transmitted by the infrared light source 11 is large. When other conditions (e.g., resistors) are not changed, the transmitted power of the infrared light source 11 is positively proportional to the working current of the infrared light source 11. Therefore, when the working current of the infrared light source 11 is increased, the transmitted power of the infrared light source 11 is increased, thereby raising the light intensity of the infrared light. In the iris collection method in accordance with the embodiment of the present disclosure, the light intensity of the infrared light reaching the iris of the person to be recognized is controlled to be the target light intensity. The above-mentioned target light intensity is a preferred light intensity. The iris recognition module 10 can acquire an iris image with good brightness and clear texture under the target light intensity. A distance corresponding to the target light intensity is a standard distance. After the distance detector 20 detects the distance, the iris recognition module 10 can compare the distance with the standard distance. When the distance is larger than the standard distance, it means that the iris recognition module 10 is far away from the person to be recognized. Accordingly, the working current should be increased to raise the light intensity of the infrared light transmitted by the infrared light source 11, so that the light intensity reaching the iris of the person to be recognized is raised to the target light intensity. When the distance is smaller than the standard distance, it means that the iris recognition module 10 is close to the person to be recognized. Accordingly, the working current should be decreased to weaken the light intensity of the infrared light transmitted by the infrared light source 11, so that the light intensity reaching the iris of the person to be recognized is weakened to the target light intensity. As such, the infrared camera 12 can collect the iris of the person to be recognized by acquiring the infrared light having the target light intensity reflected by the iris, thereby acquiring the high quality iris image.

Please refer to FIG. 3. In some embodiments, a computer readable storage medium in accordance with an embodiment of the present disclosure includes computer programs used in combination with the electronic device 100 capable of capturing an image. The computer programs are capable of being executed by the processor 40 to achieve the iris collection method in accordance with any one of the above-mentioned embodiments of the present disclosure.

For example, the computer programs can be executed by the processor 40 to achieve the following operations in the iris collection method: acquiring a distance between an iris recognition module and an iris of a person to be recognized; adjusting light intensity of transmitted infrared light according to the distance by the infrared light source, so that light intensity of infrared light reaching the iris of the person to be recognized is a target light intensity; and collecting an iris image of the iris by acquiring infrared light having the target light intensity reflected by the iris.

Adjusting the light intensity of the transmitted infrared light according to the distance by the infrared light source is implemented by adjusting a working current of the infrared light source.

For example, the computer programs can be executed by the processor 40 to achieve the following operations in the iris collection method: controlling a laser generator to transmit laser signals to the iris; controlling a laser receiver to receive reflected laser signals from the iris; calculating a plurality of sub distances according to time differences from the transmitted laser signals to the received reflected laser signals; and determining a maximum one of the sub distances, a median one of the sub distances, or an average value of the sub distances as a distance.

For example, the computer programs can be executed by the processor 40 to achieve the following operations in the iris collection method: controlling an infrared light generator to transmit infrared light signals to the iris; controlling an infrared light receiver to receive reflected laser signals from the iris; calculating a plurality of sub distances according to time differences from the transmitted infrared light signals to the received reflected infrared light signals; and determining a maximum one of the sub distances, a median one of the sub distances, or an average value of the sub distances as a distance.

For example, the computer programs can be executed by the processor 40 to achieve the following operation in the iris collection method: capturing a face image of the person to be recognized. Acquiring the distance between the infrared light source and the iris of the person to be recognized comprises: processing the face image to acquire an iris area; calculating a ratio of the iris area to the face image; and determining the distance according to the ratio.

In the description of the specification, reference terminologies "an embodiment", "some embodiments", "an illustrate embodiment", "an example", "a specific example", or "some examples", "some embodiments", "some embodiments", "some embodiments", or "some embodiments" mean that specific features, structures, materials, or characteristics in conjunction with the description of the embodiments or examples are included in at least one of the embodiments or examples. In the specification, the illustrated description of the above-mentioned terminologies is not limited to the same embodiment or example. Moreover, the described specific features, structures, materials, or characteristics may be combined in a proper way in any one or more of the embodiments or examples.

In addition, in the description of the present disclosure, terms "first" and "second" are only used for description and cannot be seen as indicating or implying relative importance. As such, the feature limiting "first" and "second" can indicate or imply to include at least one the feature. Furthermore, in the description of the present disclosure, unless otherwise explained, it should be understood that a term of "a plurality of" refers to two or more, for example, two or three.

Any process or method described in a flowchart or described herein in other ways may be understood to include one or more modules, segments or portions of codes of executable instructions for achieving specific logical functions or operations in the process, and the scope of the embodiments of the present disclosure includes other implementations, which should be understood by those skilled in the art. Although the flowchart shows a specific order of execution, those skilled in the art should understand that the order of the functions may differ from that which is depicted.

The logic and/or operation described in other manners herein or shown in the flowchart, for example, a particular sequence table of executable instructions for realizing the logical function, may be specifically achieved in any computer readable medium to be used by the instruction execution system, device or device (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that various parts of the present disclosure may be implemented by means of hardware, software, firmware or a combination thereof. In the above-mentioned, a plurality of operations or methods may be implemented by means of software or firmware stored in a memory and executed by an appropriate instruction execution system. For example, if implemented by means of hardware, as in another embodiment, it can be implemented by means of any one or a combination of the following techniques commonly known in the art: a discrete logical circuit having a logical gate circuit used for implementing a logical function for a data signal, an application-specific integrated circuit having an appropriate combinational logical gate circuit, a programmable gate array (PGA), a field programmable gate array (FPGA), etc.

It should be noted that those skilled in the art may understand all or some of the processes in the methods of the embodiments described above can be implemented by using programs to instruct corresponding hardware. The programs may be stored in a computer readable storage medium. When the programs are executed, one or combinations of the processes in the methods of the above embodiments may be performed.

In addition, in various embodiments of the present disclosure, the functional units may be integrated in one processing module, or may separately and physically exist, or two or more units may be integrated in one module. The above-mentioned integrated module may be implemented by hardware, or may be implemented by software functional modules. When the integrated module is implemented in the form of software functional modules and sold or used as independent products, the integrated module may be stored in a computer readable storage medium.

While the embodiments of the present disclosure have been shown and described, it will be understood the above-mentioned embodiments are merely exemplary to explain the present disclosure and not to be construed as limiting the present disclosure. Various changes, modifications, equivalents, and variants may be made by those skilled in the art from the scope of the present disclosure.

What is claimed is:

1. An iris collection method, used for an electronic device, the electronic device comprising an infrared light source and a distance detector, the iris collection method comprising:
   acquiring a distance between the infrared light source and an iris of a person to be recognized;
   adjusting light intensity of transmitted infrared light according to the distance by the infrared light source, so that light intensity of infrared light reaching the iris of the person to be recognized is a target light intensity; and
   collecting an iris image of the iris by acquiring infrared light having the target light intensity reflected by the iris;
   wherein the acquiring the distance between the infrared light source and the iris of the person to be recognized comprises:
   transmitting laser signals to the iris;
   receiving reflected laser signals from the iris;
   calculating a plurality of sub distances according to time differences from the transmitted laser signals to the received reflected laser signals; and
   determining a maximum one of the sub distances, a median one of the sub distances, or an average value of the sub distances as the distance.

2. The iris collection method of claim 1, wherein the acquiring the distance between the infrared light source and the iris of the person to be recognized further comprises:
   transmitting infrared light signals to the iris;
   receiving reflected infrared light signals from the iris;

calculating a plurality of sub distances according to time differences from the transmitted infrared light signals to the received reflected infrared light signals; and determining a maximum one of the sub distances, a median one of the sub distances, or an average value of the sub distances as the distance.

3. The iris collection method of claim 1, further comprising:

capturing a face image of the person to be recognized;

wherein the acquiring the distance between the infrared light source and the iris of the person to be recognized comprises:

processing the face image to acquire an iris area;

calculating a ratio of the iris area to the face image; and determining the distance according to the ratio.

4. The iris collection method of claim 3, wherein the electronic device comprises an infrared camera, and the capturing the face image of the person to be recognized comprises utilizing the infrared camera to capture the face image.

5. The iris collection method of claim 3, wherein the electronic device comprises a visible light camera, and the capturing the face image of the person to be recognized comprises utilizing the visible light camera to capture the face image.

6. The iris collection method of claim 1, wherein the adjusting the light intensity of the transmitted infrared light according to the distance by the infrared light source is implemented by adjusting a working current of the infrared light source.

7. An electronic device, comprising:

an infrared camera and an infrared light source; and a distance detector configured to acquire a distance between the infrared light source and an iris of a person to be recognized;

wherein the infrared light source is configured to adjust light intensity of transmitted infrared light according to the distance, so that light intensity of infrared light reaching the iris of the person to be recognized is a target light intensity; and the infrared camera is configured to collect an iris image of the iris by acquiring infrared light having the target light intensity reflected by the iris;

wherein the distance detector comprises a laser distance sensor, and the laser distance sensor comprises:

a laser generator configured to transmit laser signals to the iris;

a laser receiver configured to receive reflected laser signals from the iris; and a laser processing circuit configured to calculate a plurality of sub distances according to time differences from the transmitted laser signals to the received reflected laser signals, and configured to determine a maximum one of the sub distances, a median one of the sub distances, or an average value of the sub distances as the distance.

8. The electronic device of claim 7, wherein the laser generator and the infrared light source are the same element and configured to transmit infrared laser.

9. The electronic device of claim 7, wherein the distance detector comprises an infrared distance sensor, and the infrared distance sensor comprises:

an infrared light generator configured to transmit infrared light signals to the iris;

an infrared light receiver configured to receive reflected infrared light signals from the iris; and an infrared light processing circuit configured to calculate a plurality of sub distances according to time differences from the transmitted laser signals to the received reflected laser signals, and configured to determine a maximum one of the sub distances, a median one of the sub distances, or an average value of the sub distances as the distance.

10. The electronic device of claim 9, wherein the infrared light generator and the infrared light source are the same element and configured to transmit the infrared light.

11. The electronic device of claim 7, wherein the infrared camera is further configured to capture a face image of the person to be recognized;

the distance detector is further configured to process the face image to acquire an iris area, calculate a ratio of the iris area to the face image, and determine the distance according to the ratio.

12. The electronic device of claim 7, further comprising a visible light camera, the visible light camera configured to capture a face image of the person to be recognized;

wherein the distance detector is further configured to process the face image to acquire an iris area, calculate a ratio of the iris area to the face image, and determine the distance according to the ratio.

13. The electronic device of claim 7, wherein the infrared is configured to adjust the light intensity of the transmitted infrared light according to the distance by adjusting a working current of the infrared light source.

14. A non-transitory computer readable medium, comprising computer programs used in combination with an electronic device capable of capturing an image, the electronic device comprising an infrared light source, a distance detector and a processor, and the computer programs being executed by the processor to achieve:

acquiring a distance between the infrared light source and an iris of a person to be recognized;

adjusting light intensity of transmitted infrared light according to the distance by the infrared light source, so that light intensity of infrared light reaching the iris of the person to be recognized is a target light intensity; and collecting an iris image of the iris by acquiring infrared light having the target light intensity reflected by the iris;

wherein the distance detector comprises a laser distance sensor, the laser distance sensor comprising a laser generator, a laser receiver, and a laser processing circuit, and the computer programs are executed by the processor to achieve:

controlling the laser generator to transmit laser signals to the iris;

controlling the laser receiver to receive reflected laser signals from the iris;

calculating a plurality of sub distances according to time differences from the transmitted laser signals to the received reflected laser signals; and determining a maximum one of the sub distances, a median one of the sub distances, or an average value of the sub distances as the distance.

15. The non-transitory computer readable medium of claim 14, wherein the distance detector comprises an infrared distance sensor, the infrared distance sensor comprising an infrared light generator, an infrared light receiver, and an infrared light processing circuit, and the computer programs are executed by the processor to achieve:

controlling the infrared light generator to transmit infrared light signals to the iris;

controlling the infrared light receiver to receive reflected infrared light signals from the iris;
calculating a plurality of sub distances according to time differences from the transmitted infrared light signals to the received reflected infrared light signals; and
determining a maximum one of the sub distances, a median one of the sub distances, or an average value of the sub distances as the distance.

16. The non-transitory computer readable medium of claim 14, wherein the computer programs are executed by the processor to achieve:
capturing a face image of the person to be recognized;
wherein the acquiring the distance between the infrared light source and the iris of the person to be recognized comprises:
processing the face image to acquire an iris area;
calculating a ratio of the iris area to the face image; and
determining the distance according to the ratio.

17. The non-transitory computer readable medium of claim 14, wherein the adjusting the light intensity of the transmitted infrared light according to the distance by the infrared light source is implemented by adjusting a working current of the infrared light source.

\* \* \* \* \*